United States Patent [19]
Pugh

[11] 3,758,086
[45] Sept. 11, 1973

[54] HUMIDIFIER WITH FLUSHING SYSTEM
[75] Inventor: Hubert M. Pugh, North Judson, Ind.
[73] Assignee: Thermo-Products, Inc., North Judson, Ind.
[22] Filed: Dec. 1, 1971
[21] Appl. No.: 203,608

[52] U.S. Cl................................ 261/92, 261/DIG. 46
[51] Int. Cl............................................... B01f 3/04
[58] Field of Search..................... 261/DIG. 46, 92; 415/6

[56] References Cited
UNITED STATES PATENTS

| | | | |
|---|---|---|---|
| 1,021,895 | 4/1912 | Schichtl | 415/6 |
| 1,775,036 | 9/1930 | Dunning | 261/92 |
| 2,457,545 | 12/1948 | Handwerk et al. | 261/92 X |
| 2,870,869 | 1/1959 | Mahler | 261/92 X |
| 3,189,328 | 6/1965 | Hotchkiss et al. | 261/DIG. 46 |
| 3,266,784 | 8/1966 | Saito | 261/92 X |
| 3,386,711 | 6/1968 | Williams | 261/DIG. 46 |
| 3,613,890 | 10/1971 | Hellquist | 261/92 X |

Primary Examiner—Tim R. Miles
Assistant Examiner—Richard L. Chiesa
Attorney—Oltsch & Knoblock

[57] ABSTRACT

A humidifier having a fluid reservoir and a rotatable fluid absorption pad which is in air contact and which is positioned over the reservoir in contact with the fluid therein. A fluid inlet is provided for maintaining the fluid in the reservoir at a specified level. A fluid transfer component is associated with the absorption pad and upon rotation of the absorption pad causes a portion of the fluid in addition to the fluid absorbed by the pad to be removed from the reservoir so that a continual fresh supply of fluid enters the reservoir through the fluid inlet during rotation of the pad.

3 Claims, 3 Drawing Figures

PATENTED SEP 11 1973 3,758,086

INVENTOR.
HUBERT M. PUGH
BY Oltsch & Knoblock
ATTORNEYS

HUMIDIFIER WITH FLUSHING SYSTEM

SUMMARY OF THE INVENTION

This invention relates to a humidifier and has application to an improved construction of that type of humidifier having a movable fluid absorption means in contact with a reservoir of fluid.

Humidifiers which utilize a fluid absorption pad include a reservoir or pan which contains water through which the absorption pad is caused to pass. Room air is passed through or over the pad causing the water therein to evaporate and enter the air. As the water in the absorption pad is evaporated, minerals from the evaporated water are retained within the pad and are redeposited into the water in the reservoir as the pad passes through the water. Eventually the water within the reservoir must be drained and the absorption pad cleaned or replaced for the humidifier to operate efficiently.

In this invention a scoop means contacts the water in the reservoir as the absorption pad passes through the water and serves to remove an additional quantity of water from the reservoir, thus allowing more fresh water to be added to the reservoir by means of a valve controlled inlet. In this manner, the water within the reservoir is continuously freshened during the movement of the absorption pad, thereby reducing the amount of mineral material in the water and increasing the over-all efficiency of the humidifier between cleanings and replacement of the absorption pad.

Accordingly, it is an object of this invention to provide a humidifier which is of efficient operation.

Another object of this invention is to provide a humidifier which utilizes a rotating water absorption pad and which includes means for increasing the efficiency of the humidifier and for lengthening the period of time between cleanings and replacement of the absorption pad.

It is another object of this invention to provide a humidifier having a water reservoir in which the fluid therein is freshened during operation of the humidifier to reduce the mineral content of the water.

Other objects of this invention will become apparent upon a reading of the invention's description.

BRIEF DESCRIPTION OF THE DRAWINGS

A preferred embodiment of this invention has been chosen for purposes of illustration and description wherein.

DESCRIPTION OF THE PREFERRED EMBODIMENT

The preferred embodiment illustrated is not intended to be exhaustive or to limit the invention to the precise form disclosed. It is chosen and described in order to best explain the principles of the invention and its application and practical use to thereby enable others skilled in the art to best utilize the invention.

Figure 1:
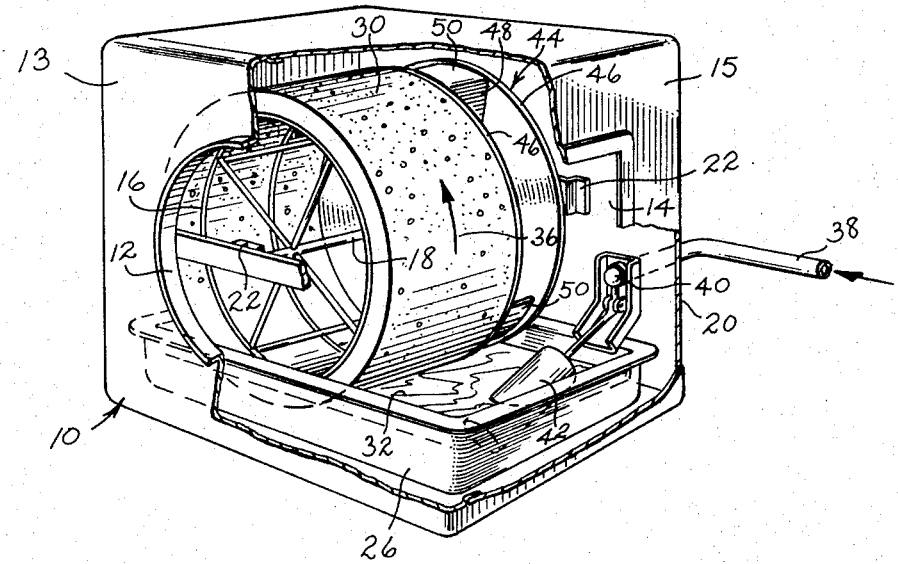
FIG. 1 is a perspective view of the humidifier with portions of the outer housing broken away for purposes of illustration.
Figure 2:
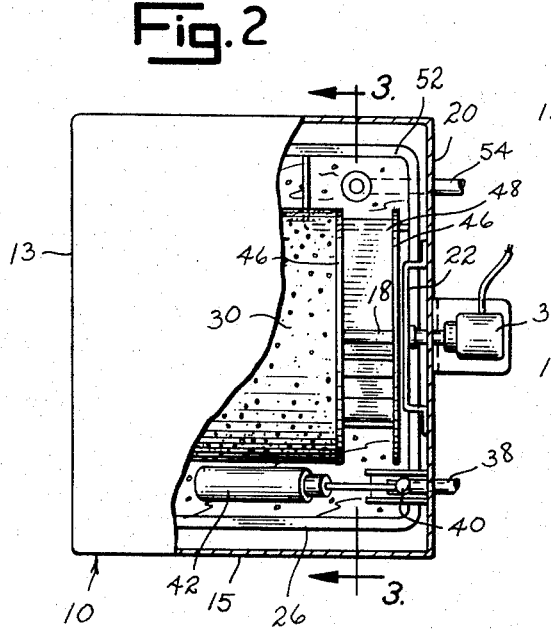
FIG. 2 is a top plan view of the humidifier of FIG. 1 shown with a portion of the outer housing removed for purposes of illustration.
Figure 3:
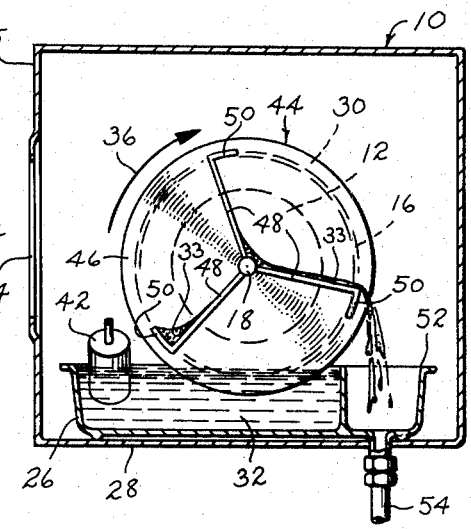
FIG. 3 is a cross sectional view taken along line 3—3 of FIG. 2.

The humidifier illustrated in FIGS. 1-3 includes an outer housing 10 having an opening 12 formed in one side wall 13 and an opening 14 formed in an adjacent end wall 15. A cylindrically shaped frame cage 16 is located within housing 10. Cage 16 is fixedly carried upon an axial shaft 18 which extends rearwardly from the cage and through side wall 20 of the housing. Shaft 18 is supported in suitable bearing brackets 22 which are connected to the inner faces of housing side walls 13 and 20. Rotation of shaft 18 causes the rotation of cage 16. The front end of cage 16 registers with opening 12 in side wall 13.

A container or reservoir 26 for water or a similar fluid rests upon bottom wall 28 of housing 10 and is located under cage 16. A cylindrical water-absorbing pad 30, which may be constructed of polyurethane, fits about cage 16 with its lower marginal portion projecting into reservoir 26 and there contacting water 32 in the reservoir. An electric drive motor 34 is secured to side wall 20 and is connected to shaft 18. Actuation of motor 34 causes cage 16 and pad 30 to slowly rotate in the direction illustrated by arrows 36 in FIGS. 1 and 3, thus causing the pad to absorb water from the reservoir. A water inlet conduit 38 is connected to housing 10 and is positioned over reservoir 26 for the purpose of replenishing the water 32 within the reservoir. A regulating valve 40 which is associated with conduit 38 and which includes a suitable float part 42 serves to regulate the flow of water into the reservoir 26 and to maintain the water within the reservoir at a predetermined level.

A water transfer device in the form of a wheel 44 is coaxially carried at the rear of cage 16. Wheel 44 includes two spaced disks or circular plates 46 which are concentrically carried upon shaft 18. One plate 46 is positioned across the rear end of cage 16 while the other plate 46 is located adjacent sidewall 20 of housing 10. A plurality of blades 48 are located between plates 46 and extend radially outwardly from shaft 18. Each blade 48 includes an angularly bent distal end portion 50 which forms a scoop and which is preferably equi-angularly spaced from the other blades. End portion 50 of each blade 48 is adapted to extend below the level of the water 32 in reservoir 26 as cage 16 is rotated so that as each blade enters water 32 upon rotation of the cage 16 a portion 33 of the water 32 in reservoir 26 will be scooped up by the blade as shown in FIG. 3. A drain 52, which may be formed as an integral but separately operable part of reservoir 26, is positioned under and to the side of wheel 44 where the water 32 which has been scooped up by blades 48 is permitted to fall as each blade completes its circle of revolution. A conduit 54 is connected to drain 52.

The above described humidifier is connected into the warm air or return air runs of the heating system of a house or other building structure. The humidifier fits into an air run with one portion of the run connected to opening 12 and another portion of the run connected to opening 14 so that the air within the run is caused to pass through air permeable pad 30. In some constructions of this invention, the air may simply pass around and over the pad and, additionally, the pad may be of an elongated belt configuration. A suitable water supply source in the building structure is connected to conduit 38. As cage 16 and pad 30 is rotated, wheel 44 serves to remove water from reservoir 26 and to deposit the water into drain 52. Conduit 54 of drain 52 may be connected into the drainage system in the building structure. Sufficient water in addition to that absorbed by pad 30 is removed by wheel 44 from reservoir 26 so as to cause valve 40 to allow a continuous or nearly continuous supply of fresh water to enter the reservoir. In this manner, the mineral content of the water in reservoir 26 is maintained at a low level.

Motor 34 which rotates cage 16 and pad 30 is preferably operatively connected to the air blower of the furnace system so as to be operable only during periods of operation of the air blower. During periods in which the air blower is not operating, cage 16 and therefore pad 30 will not be rotated and valve 40 after water 32 in the reservoir reaches a predetermined level will close conduit 38 to shut off the water flow into the reservoir. The number, position and size of wheels 44 will depend upon the capacity and air flow characteristics of the humidifier.

It is to be understood that the invention is not to be limited to the details herein given but may be modified within the scope of the appended claims.

What I claim is:

1. In a humidifier having a fluid reservoir, fluid inlet means in communication with said reservoir for introducing a fluid into said reservoir, valve control means in association with said fluid inlet means for regulating the fluid flow into said reservoir, a rotatable fluid absorption means adapted to be contacted by the air which is to be humidified, said absorption means being positioned over said reservoir and having a part in contact with said fluid in said reservoir, the improvement comprising a fluid transfer component rotatable with said absorption means, said fluid transfer component including scoop means adapted to contact said fluid in said reservoir for removing a portion of said fluid during rotation of said absorption means, said fluid transfer component being a wheel rotatable with said fluid absorption means about an axis and carrying said scoop means, said scoop means constituting a plurality of radially disposed and equal angularly spaced scoops each including a blade part and an upturned end part, the blade parts of said scoops being joined at said wheel axis and extending radially outwardly therefrom and terminating adjacent the outer circumferential periphery of said wheel in said upturned end parts, said wheel carried over said reservoir and having a lower portion of its said outer circumferential periphery in contact with said fluid in all rotative positions of said wheel, each scoop during rotation of said wheel about its said axis having a fluid-gathering and carrying position in which the scoop enters the fluid in the reservoir and removes a portion of the fluid which is retained between the blade and upturned end part of the scoop and a discharge position in which the blade and upturned end part of the scoop are inverted to cause said retained fluid to flow toward said wheel axis and over the inverted blade and upturned end part of the joining lower inverted scoop, a drain receptacle means located to one side of said wheel and at the outer circumferential periphery of the wheel under said inverted upturned end part of the joining lower scoop to catch the fluid as it flows over said upturned end part.

2. The humidifier of claim 1 wherein said absorption means is a cylindrical pad.

3. The humidifier of claim 1 wherein said valve control means maintains a selected fluid level in said reservoir as said fluid transfer component and said absorption means removes portions of said fluid from said reservoir.

* * * * *